(12) United States Patent
Blanken

(10) Patent No.: US 7,772,823 B2
(45) Date of Patent: Aug. 10, 2010

(54) ELECTRONIC CONTROLLER WITH INTEGRATING ACTION

(75) Inventor: Pieter G. Blanken, Eindhoven (NL)

(73) Assignee: ST-Ericsson SA, Geneva (CH)

( * ) Notice: Subject to any disclaimer, the term of this patent is extended or adjusted under 35 U.S.C. 154(b) by 498 days.

(21) Appl. No.: 11/576,250

(22) PCT Filed: Sep. 23, 2005

(86) PCT No.: PCT/IB2005/053160

§ 371 (c)(1),
(2), (4) Date: Mar. 28, 2007

(87) PCT Pub. No.: WO2006/035394

PCT Pub. Date: Apr. 6, 2006

(65) Prior Publication Data

US 2007/0216391 A1    Sep. 20, 2007

(30) Foreign Application Priority Data

Sep. 28, 2004    (EP) ................................. 04300632

(51) Int. Cl.
*G05F 1/00* (2006.01)
(52) U.S. Cl. .................. 323/284; 323/223; 323/224; 323/271; 323/282; 323/285; 323/288; 323/351
(58) Field of Classification Search .................. 323/223, 323/224, 271, 282, 284, 285, 288, 351
See application file for complete search history.

(56) References Cited

U.S. PATENT DOCUMENTS

| 6,611,131 | B2 | 8/2003 | Edwards | |
| 6,894,471 | B2 * | 5/2005 | Corva et al. | 323/282 |
| 7,042,203 | B2 * | 5/2006 | Van Der Horn et al. | 323/285 |
| 7,208,921 | B2 * | 4/2007 | Walters | 323/222 |
| 7,508,178 | B2 * | 3/2009 | McDonald et al. | 323/271 |

* cited by examiner

*Primary Examiner*—Patrick J Assouad
*Assistant Examiner*—Manuel Hernandez

(57) ABSTRACT

A controller (1) comprises a comparator (10) which compares an input signal (Vo) with a reference signal (Vr) to obtain an error signal (ER). An integrator (11) applies an integrating action on the error signal (ER) to obtain a control signal (ICO). The integrator (11) allows influencing the integrating action. A copy circuit (81) supplies a copy control signal (ICOC) being proportional to the control signal (ICO). A determination circuit (85) determines whether the copy control signal (ICOC) reaches a limit value (IMIN, IMAX). An influencing circuit (83) influences the integrating action to limit the control signal (ICO) when the copy control signal (ICOC) reaches the limit value (IMIN, IMAX).

20 Claims, 8 Drawing Sheets

ELECTRONIC CONTROLLER WITH INTEGRATING ACTION

FIELD OF THE INVENTION

The invention relates to a controller, a current-mode controlled DC/DC converter comprising such a controller, an apparatus comprising the current-mode controlled DC/DC converter, and method of controlling.

BACKGROUND OF THE INVENTION

In a current-mode controlled DC/DC converter, a controllable switch is coupled to an inductor to generate a periodically changing inductor current through the inductor. An outer voltage regulation loop comprises a current-mode controller that subtracts the output voltage of the converter from a reference voltage to supply an error signal that is processed to obtain a control signal. This control signal may be used as a set level for the peak current in the inductor. The processing usually comprises a PI or a PID controller, which receives the error signal and supplies the control signal. Therefore, often, this processing is also referred to as a controller. An inner current regulation loop switches off the controllable switch when a sense signal that is representative for the inductor current reaches the set level. Thus, the set level, which depends on the difference between the output voltage level and the reference voltage level, determines a peak current level of the current through the inductor. Many options to determine this sense signal are known. For example, the sense signal may be obtained with a current transformer, or as a voltage over an impedance in series with the inductor, this series impedance may be in the main current path of the switch.

Usually, the switch is switched on by a clock pulse generated by an oscillator. The on-time of the switch is the period of time between the instant the switch is switched on by the clock pulse and the instant the inductor current reaches the set level. The off-time of the switch is the period in time between the instant the inductor current reaches the set level and the next clock pulse. The repetition period is the sum of the on-time and the off-time. In a buck converter, during the on-time, the switch connects the inductor between an input voltage and the output and the inductor current increases. The input voltage may be supplied by a battery. During the off-time, another switch connects the inductor between the output and ground and the inductor current decreases. The topology of other current-mode controlled DC/DC converters, such as for example, boost, buck-boost, Cuk converters, is also well known.

Usually, slope compensation is required to damp the disturbances in the inductor current. The slope compensation is obtained by varying the set level as a function of time during the repetition period. Often, the current-mode controller either subtracts a sawtooth, a parabola, or a piecewise linear slope compensation signal from the control signal to obtain a slope compensated control signal. Now, this slope compensated control signal is used as the set level, and thus, the off-period starts at the instant the peak-current through the inductor reaches the level of the slope compensated control signal.

In some applications, such as for example in telecom systems, the reference voltage is varied to obtain a varying output voltage which fits the actual transmission power required. It is important that the output voltage of the power converter tracks the variations of the reference voltage optimally. It is a drawback of the known current-mode controlled DC/DC converter that its speed of reacting on a variation of the reference voltage is not optimal.

U.S. Pat. No. 6,611,131 discloses such a current-mode switching regulator. As prior art, a current-mode switching regulator is discussed in which a voltage clamp is present across the integrating capacitor of the I-controller. This voltage clamp limits the control voltage present at the integrating capacitor. Thus, also the inductor current will be limited. It is further disclosed that this prior art solution has the drawback that the actual value to which the inductor current is limited depends on the slope compensation. Therefore, U.S. Pat. No. 6,611,131 proposes to use a voltage clamp which clamps the voltage at an output of a buffer which buffers the voltage across the integrating capacitor. The voltage at which the output of the buffer is limited depends on the slope compensation. Now, the level at which the current is limited depends less on the slope compensation signal. However, this solution has the drawback that the integrating control loop is not closed during the limiting action and consequently, the voltage over the integrating capacitor drifts away.

SUMMARY OF THE INVENTION

It is an object of the invention to provide a controller of which the output signal is limited and wherein the integrator drifts away less.

A first aspect of the invention provides a controller as claimed in claim 1. A second aspect of the invention provides a current-mode controlled DC/DC converter as claimed in claim 10. A third aspect of the invention provides an apparatus as claimed in claim 16. A fourth aspect of the invention provides a method of controlling as claimed in claim 18. Advantageous embodiments are defined in the dependent claims.

The controller in accordance with the first aspect of the invention comprises a comparator, an integrator, a copy circuit, a determination circuit, and an influencing circuit. Such a controller is usually referred to as an I-controller. In the well known I-controllers, the comparator compares an input signal with a reference signal and supplies an error signal. The error signal indicates the difference between the input signal and the reference signal. The integrator integrates the error signal to obtain a control signal.

An example of the use of such an I-controller in a power converter is disclosed in U.S. Pat. No. 6,611,131. In this application, the input signal of the I-controller is an output voltage of the power converter, and the reference signal is a reference voltage. The control signal supplied by the I-controller controls the power converter such that its output voltage is determined by the reference voltage.

The integrator allows influencing its integrating action. For example, if the integrator comprises an integrating capacitor, the integrator comprises an input for influencing the current supplied to the integrator capacitor. The copy circuit generates a copy control signal which is proportional to the control signal. The copy control signal may be identical to the control signal but has to be present at a separate node. The determination circuit determines whether the copy control signal reaches a limit value. The influencing circuit influences the integrating action to limit the control signal when is determined that the copy control signal reaches or passes the limit value.

Thus, now, the separate circuit that compares the copy control signal with the limit value is not disrupting the operation of the main path which is formed by the comparator and the integrator. The loop from the input signal to control signal is still fully operational, and the control signal is still coupled to the state of the integrator. Or said differently, by influencing the integrating action such that the control signal is limited, the link between the integrator state and the control signal is kept. In the prior art U.S. Pat. No. 6,611,131, the voltage at the output of the buffer is limited, thus the limiting action takes place in the main loop from input signal to control signal. However, the control loop still detects a difference between the input signal and the reference signal and the integrator goes on acting to minimize this difference. Thus, the change of the integrator state is not anymore represented by the clamped output voltage of the buffer. Consequently, the integrator will drift far away from its nominal state. When the limiting is not anymore required, it takes a long time before the integrator changes back to its nominal state.

It has to be noted that the controller, besides the integrator, optionally, may comprise a proportional and/or a differentiating action to obtain a PI, ID, or PID controller.

In an embodiment in accordance with the invention as claimed in claim 2 the limit value indicates a maximum level, and the influencing circuit decreases the integrating action when the copy control signal reaches the maximum level. For example, if the integrating action is obtained by charging a capacitor, this capacitor is discharged until the copy control signal is equal to the maximum level. And thus, because the copy control signal is a (scaled) copy of the control signal, also the control signal is limited to a maximum value.

In an embodiment in accordance with the invention as claimed in claim 3 the limit value indicates a minimum level, and the influencing circuit increases the integrating action when the copy control signal reaches the minimum level. For example, if the integrating action is obtained by charging a capacitor, this capacitor is charged until the copy control signal is equal to the minimum level.

In an embodiment in accordance with the invention as claimed in claim 4, the copy circuit comprises a first current source which supplies the copy control signal as a first current to a node. The determination circuit comprises a second current source that supplies a predetermined fixed second current to the node which may be controllable. The first current and the second current have an opposite polarity to obtain a difference current. For example, the first current is drawn out of the node while the second current is supplied to the node. The determination circuit further comprises a clamping circuit that limits a voltage at the node. The influencing circuit comprises an amplifier that has an input connected to the node and an output connected to the input of the integrator to influence the integrating action. The difference current flows into the clamping circuit as long as the voltage at the node is in a range wherein no clamping is required, the difference current flows towards the influencing circuit if the voltage at the node reaches or crosses the limit value at which limitation of the control signal is required. Such a controller with current sources can be easily implemented in an integrated circuit.

In an embodiment in accordance with the invention as claimed in claim 5, the integrator comprises an integrating capacitor, and the output of the influencing amplifier is coupled to the integrating capacitor to supply or withdraw current from the capacitor when the control signal has to be limited. The amplifier has no influence at all if the control signal need not be limited. Thus, if no limiting is required, the main loop is not disturbed.

In an embodiment in accordance with the invention as claimed in claim 6, the integrator comprises a third current source to supply the control signal as a third current which is determined by a voltage across the integrating capacitor.

Now, also the control signal is generated with an easy to integrate current source. It has to be noted that the voltage on the integrating capacitor may control both the current sources for generating the control current and the copy control current. Alternatively, it is possible to only control the control current and to mirror the control current to obtain the copy control current.

In an embodiment in accordance with the invention as claimed in claim 7, the amplifier comprises a transistor, which has a control input coupled to the node, and a main current path coupled to the integrating capacitor. Thus, the voltage on the node determines the amount of current supplied to or withdrawn from the integrating capacitor.

In an embodiment in accordance with the invention as claimed in claim 8, the clamping circuit comprises a transistor with a main current path coupled to the node and a control input. A voltage source is coupled to the control input. Thus, depending on the arrangement of the transistor control input and the level of the voltage source, the transistor conducts the difference current as long as the voltage at the node is higher or lower than the voltage supplied by the voltage source.

In an embodiment in accordance with the invention as claimed in claim 9, the comparator comprises a first transconductance amplifier, which has inputs to receive the input signal and the reference signal, and outputs to supply the error signal. Such a transconductance amplifier as such is well known. The integrator comprises a capacitor arranged between the outputs of the first transconductance amplifier. A second transconductance amplifier has inputs coupled across the capacitor, and outputs to supply the control signal as an output current. The copy circuit comprises a third transconductance amplifier with inputs coupled across the capacitor, and outputs to supply the copy control signal as a copy control current. The determination circuit comprises a current source arranged between the outputs of the third transconductance amplifier, and a first transistor arranged between the outputs of the third transconductance amplifier to act as a clamp. The current source is arranged to supply the limit value as a limit current. The influencing circuit comprises a transistor with a main current path arranged between the outputs of the first transconductance amplifier, and a control input coupled to one of the outputs of the third transconductance amplifier to influence a voltage across the capacitor when the copy control current reaches the limit current. The transistor is arranged to obtain a feedback loop. Such an implementation with transconductance amplifiers is very suited to be used in an integrated circuit.

In the current-mode controlled DC/DC converter in accordance with the second aspect of the invention, the controller is used to regulate the current-mode controlled DC/DC converter (further also referred to as the power converter). The power converter receives a power supply input voltage and supplies a power supply output voltage to a load. The power supply output voltage is the input signal of the controller as mentioned earlier. The output signal of the controller, which is the control signal, is supplied to the power converter controller.

The power converter controller (also referred to as driver circuit) controls the power converter such that its output voltage is determined by the control signal. In fact, in a current-mode controlled power converter, the control signal determines the level at which the current in the inductor of the power converter reaches the limit value at which a controllable switch coupled to the inductor is switched off. The controller generates the control signal from the difference between the output voltage of the power converter and the reference voltage.

A driver circuit compares a sensed signal representative for the inductor current with the control signal to switch off the controllable switch when a level of the sensed signal reaches a level of the control signal. Usually, the controllable switch is switched on by a clock signal of an oscillator that is running on a fixed frequency. The on- and off-switching of the controllable switch causes a periodically varying inductor current through the inductor.

The use of the controller in accordance with the invention allows limiting the current through the inductor while the feedback loop from the output voltage of the power converter to the control signal is still active. This is because the link between the state of the integrator and the control signal is still present. The extra path with the copy control current only influences the integrating action to obtain a control signal that is limited, but does not decouple the integrating action and the control signal. For example, if the integrator is an analog integrator that comprises an integrating capacitor, the voltage on the capacitor both represents the state of the integrator and determines the level of the control signal. Alternatively, if the integrator is a digital integrator, the value reached by the integrator both represents the state of the integrator and determines the level of the control signal. In fact, in accordance with the invention, the state of the integrator is determined by the difference between the reference signal and the input signal of the integrator. For example, if the input signal of the controller, which is the or a tapped in output voltage of the power converter, has a level higher than the level of the reference signal, the integrator decreases the voltage on the capacitor or the value stored digitally, and the control signal decreases. The decreasing control signal causes the driver to take actions to lower the output voltage of the power converter. In a current-mode power converter wherein the controllable switch is switched off when the sensed current reaches the level of the control signal, the level of the control signal should decrease if the output voltage of the power converter is too high, such that the on-time of the switch decreases. In other applications this may be the other way around.

Usually, the I-controller subtracts the output voltage of the converter from the reference voltage to obtain the error signal. The controller has a transfer function that is applied on the error signal to obtain the control signal. The transfer function, for example, may be any combination of a P (proportional), I (Integrating), D (differentiating) regulator, but should have at least the I-action. Alternatively, the transfer function may be a filter having at least an integrating action. Relevant is that the transfer function of the I-controller at least comprises an integrating action.

In an embodiment in accordance with the invention as claimed in claim 11, the current-mode controlled DC/DC converter further comprises a correction circuit which adds a correction signal to the control signal to obtain a modified control signal. The correction signal is representative for a difference between the original control signal and an average value of the inductor current. A drive circuit compares a sensed signal that is representative for the inductor current with the modified control signal to switch off the controllable switch when a level of the sensed signal reaches a level of the modified control signal. Now, the switch is switched off when the level of the sensed signal reaches the level of the modified control signal. Thus, the control signal now more resembles the average value of the inductor current. The limiting of the control signal now in fact advantageously limits the average inductor current instead of the peak inductor current.

In the prior art current-mode controlled DC/DC converters, if no slope compensation is present, the control signal is representative for the peak level of the inductor current because the control signal determines the peak level of the inductor current at which the switch is switched off. If slope compensation is present, the slope compensated control signal still is representative for the peak level of the inductor current. Consequently, the modified control signal is representative for the peak level of the inductor current to which the slope compensation signal is added. This is elucidated in detail with respect to FIGS. 6 and 7. The open loop gain from the differential input voltage (the reference voltage level minus the output voltage level, or the other way around) to the output voltage depends on the topology of the controller, which now is also referred to as current-mode controller. Usually, the current-mode controller is a P, a PI or a PID controller. The unity-gain frequency of this open loop gain appears to depend on the transfer from the control signal to the average output current. In the prior art, this transfer is smaller than 1 because the ripple current through the inductor causes the average inductor current to be smaller than the peak current (the latter is controlled), and, if present, the slope compensation also causes the peak inductor current to be smaller than the control signal.

In contrast, the current-mode controlled DC/DC converter in accordance with the present embodiment of the invention comprises the correction circuit that receives the control signal and supplies a modified control signal which is used as the set level to be compared with the sensed level. The correction circuit adds a correction signal to the control signal to obtain the modified control signal. Because the modified control signal still determines the peak level of the inductor current, now the control signal must be representative for the peak level of the inductor current minus the correction signal, if no slope compensation is present. Thus, if the correction signal is representative for the difference between the peak inductor current and the average inductor current, the control signal is more representative for the average inductor current instead of the peak inductor current. Or said in different words, due to the closed loop from differential input voltage to the output voltage, at a same difference between the output voltage and the reference voltage, the modified control signal is independent on the characteristics of the open loop from the differential input voltage to the set level. The output voltage has to reach the same value at a same peak value of the inductor current, and thus the set level (which is now the modified control signal) should be the same. Consequently, the addition of the correction circuit which adds a correction signal representative for the difference between the control signal and the average current through the inductor, causes the value of the control signal to drop with this difference. Now, the control signal supplied by the current-mode controller is representative for the average inductor current instead of the peak inductor current and/or slope compensation current. The transfer function from the control signal to the average output current becomes more equal to unity and the −3 dB bandwidth increases. Further, advantageously, now the average inductor current is limited instead of the peak current.

The correction circuit may add a correction signal representative for a difference between an average value and an extreme value of the inductor current. The control signal now becomes more equal to the average current through the inductor because the difference between the peak current and the average current is compensated for. Or, at least, this difference is decreased.

Alternatively, if the current-mode controlled DC/DC converter further comprises a slope compensation circuit that generates a slope compensation signal, again, the correction circuit adds the correction signal to the control signal to obtain a modified control signal. Now, the correction signal is, or is representative for, a sum of the level of the slope compensation signal at the switch-off instant and the difference between the peak current and the average current through the inductor. The difference between the peak current and the average current through the inductor was already catered for, the additional attenuation introduced by the slope compensation is also removed. Consequently, the control signal is representative for the average current through the inductor. This again has the advantage that by limiting the control signal of the controller, the average current of the power converter is limited, independent on the slope compensation.

In an embodiment in accordance with the invention as claimed in claim 12, the limiting circuit is used to limit a minimum and/or maximum value of the control signal. Now, because the control signal is representative for the average current through the inductor, such a limiting circuit directly limits this average current. Not only a copy of the control signal but also a copy of the correction current is generated. The limiting circuit now detects when the sum of the copy control signal and the copy correction signal reaches the limit value, and influences the integrator accordingly to obtain the limited control signal.

In an embodiment in accordance with the invention as claimed in claim 13, again, easy to integrate current sources are used to implement the copy control signal and the clamping circuit.

In an embodiment in accordance with the invention as claimed in claim 14, further, the copy correction signal is generated by an easy to integrate current source.

In an embodiment in accordance with the invention as claimed in claim 15, the current-mode controlled DC/DC converter is a buck converter, and the signals are currents that are summed at a node. The current-mode controller comprises a controlled current source, which supplies a control current determined by the control signal to the node. The correction circuit comprises a current source, which supplies the correction signal as a correction current to the node. A sense circuit senses the inductor current and supplies the sensed signal as a sensed current to the node. The polarities of the control current and the correction current are the same are and opposite to a polarity of the sensed current. Thus, if, for example, the sensed current flows towards the node, both the control current and the correction current flow away from the node. The driver circuit is coupled to the node to determine when the level of the sensed current crosses the level of the sum of the control current and the correction current. If the sensed current crosses this sum, the switch is switched off.

These and other aspects of the invention are apparent from and will be elucidated with reference to the embodiments described hereinafter.

DETAILED DESCRIPTION OF THE PREFERRED EMBODIMENT

Figure 1:
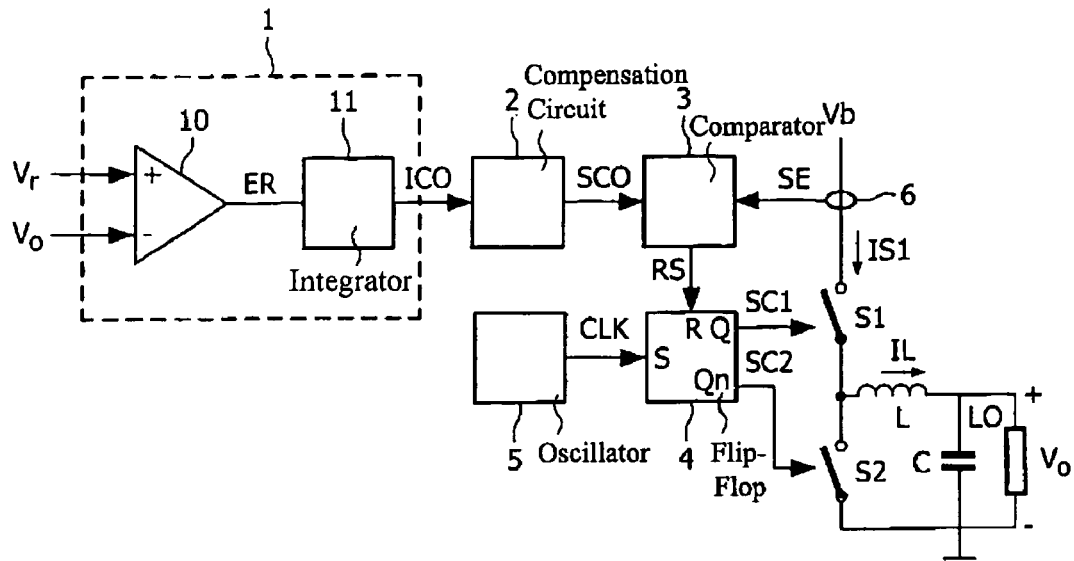
FIG. 1 shows a block diagram of a prior art current-mode controlled DC/DC converter.

FIG. 1 shows a block diagram of a prior art current-mode controlled DC/DC converter. Especially in telecom systems wherein a handheld has to manage the transmission-power economically to increase the battery life, the power supply voltage of a transmitting output amplifier should be controlled to optimally suite the actual transmission power. The current-mode DC/DC converter (further also referred to as power converter, or converter) which supplies the power supply voltage should be able to modulate its output voltage fast and accurate. In the now following, the current-mode DC/DC converter is also referred to as power converter or even as converter. In this application in a handheld, the load LO represents circuits of the handheld, such as the output amplifier.

The power converter comprises current-mode controller 1 (also referred to as the controller) which supplies a control signal ICO which depends on a difference between the output voltage Vo of the converter and a reference voltage Vr. The reference voltage Vr may be constant or may be varied to obtain a corresponding varying output voltage Vo. The current mode-controller 1 comprises a subtractor 10 which subtracts the output voltage Vo from the reference voltage Vr to supply an error signal ER which represents the difference between the reference voltage Vr and the output voltage Vo. Instead of the subtractor 10 also a comparator, which compares the output voltage Vo with the reference voltage, Vr to obtain the error signal ER may be used. The current-mode controller 1 further comprises an integrator 11 which integrates the error signal ER to obtain the control signal ICO. Usually, the controller 1 is a P (Proportional) controller, an I (Integrating) controller, a PI (Proportional and Integrating) controller, or a PID (Proportional, Integrating and differentiating) controller. Such controllers are well known in the art. If in the now following is referred to the controller 1, it is meant that the controller at least comprises an integrating action performed by the integrator 11. However, the controller 1 may further also comprise a proportional and/or differential action.

The optional slope compensation circuit 2 subtracts a slope compensation signal from the control signal ICO to obtain a slope compensated control signal SCO. Usually, the slope compensation signal is sawtooth shaped, parabola shaped, or piecewise-linearly shaped. A sense circuit 6 senses the current IS1, which flows through the switch S1. The sense circuit 6 may sense any current which is representative for the inductor current IL through the inductor L. For example, the sense circuit 6 may be arranged in series with the inductor L to sense the inductor current IL directly, or the sense circuit 6 may be arranged in series with the switch S1 (as shown) or in series with the switch S2. If the sense circuit 6 is arranged in series with one of the switches S1 or S2, the inductor current IL is only sensed during the period in time the associated switch is closed. The sense signal SE which should be representative for the inductor current IL may also be sensed as a voltage, for example this voltage may be sensed over the main current path of one of the switches S1 or S2. Preferably, the switches S1 and S2 are MOSFET's, but bipolar transistors or other controllable semiconductor devices may also be used. Instead of the switch S2, a diode may be used.

The comparator 3 compares the sensed signal SE with the slope compensated control signal SCO to supply a reset signal RS to the reset input R of the Set-Reset Flip-Flop 4 when the level of the sensed signal SE reaches the level of the slope compensated control signal SCO. Instead of the Set-Reset Flip-Flop 4 a more complicated circuit may be used. An oscillator 5 generates a clock signal CLK which is supplied to the set-input S of the Set-Reset Flip-Flop 4. The non-inverting output Q of the Set-Reset Flip-Flop 4 supplies a control signal SC1 to a control input of a switch S1, and the inverting output Qn of the Set-Reset Flip-Flop 4 supplies a control signal SC2 to a control input of a switch S2. However, usually, the control of the synchronous switch S2 may be more complicated. It is also possible that the switch S2 is a diode. Then, of course, no control signal is required. When the Set-Reset Flip-Flop 4 is reset by the reset signal RS of the comparator 3, the switch S1 is opened and the switch S2 is closed. When the Set-Reset Flip-Flop 4 is set by a clock pulse CLK on the set input S, the switch S1 is closed and the switch S2 is opened.

The main current paths of the switch S1 and S2 are arranged in series between the terminals of a DC power supply which supplies the input voltage Vb to the converter. An inductor L is arranged between the junction of the main current paths of the switch S1 and S2 and the output of the converter where the output voltage Vo is supplied. A parallel arrangement of a smoothing capacitor C and a load LO is present at the output of the converter. The current through the inductor is indicated by IL.

The operation of the prior art buck converter is briefly elucidated in the now following. It is assumed that the starting situation is that the clock pulse CLK sets the Set-Reset Flip-Flop 4. Now, the switch S1 is closed and the switch S2 is opened causing the inductor current IL to increase. The inductor current IL increases until the sensed signal SE is equal to the compensated control signal SCO. Now the Set-Reset Flip-Flop 4 is reset by the reset signal RS, the switch S1 is opened and the switch S2 is closed. The inductor current IL decreases until Set-Reset Flip-Flop 4 is set again by a next clock pulse CLK.

Figure 2:
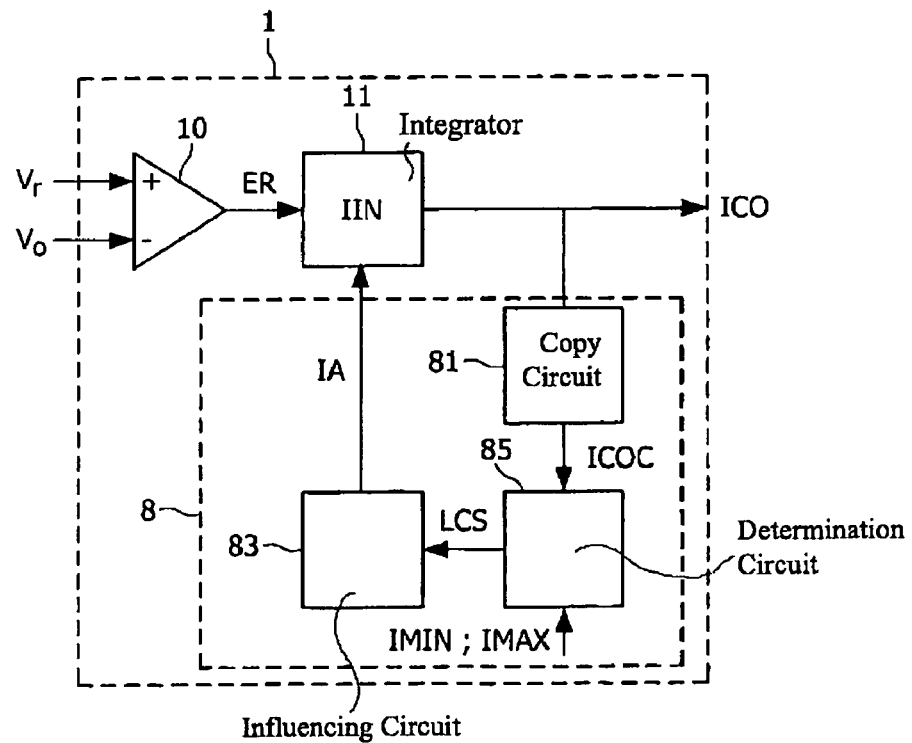
FIG. 2 shows a circuit diagram of an embodiment of the controller in accordance with the invention.

FIG. 2 shows a circuit diagram of an embodiment of the controller in accordance with the invention. The current-mode controller 1 elucidated with respect to FIG. 1, now is called the controller 1 which performs at least an integrating action. The controller 1 comprises the comparator or subtractor 10, the integrator 11, the copy circuit 81, the determination circuit 85, and the influencing circuit 83. The comparator or subtractor 10 determines an error signal ER which is the difference of the reference signal Vr and the input voltage Vo which should be controlled. The integrator 11 integrates the error signal ER and supplies the control signal ICO. The integrator 11 has an input IIN which allows influencing the integrating action of the integrator 11. The controller 1 has an input at which the input signal Vo is received, and an output at which the control signal ICO is supplied. The input signal Vo is compared with the reference signal Vr and the difference ER is integrated to, supply the control signal ICO which can be used to control a further circuit such that the input signal Vo becomes equal to the reference signal Vr.

The copy circuit 81 receives the control signal ICO and supplies a copy control signal ICOC that is proportional to the control signal ICO. For example, if the control signal ICO is a current, this current may be mirrored to obtain the copy. The determination circuit 85 receives the copy control signal ICOC, and supplies a control signal LCS indicating whether the copy control signal ICOC reaches or trespasses a limit value IMIN or IMAX. The influencing circuit 83 receives the control signal LCS to supply an influencing signal IA to the input IIN of the integrator 11 to influence the integrating action of the integrator 11. With influencing the integrating action is, for example, meant that an extra signal is added to the error signal ER such that the integrator supplies a corrected control signal ICO. For example, if the determination circuit 85 detects that the copy control signal ICOC reaches the maximum level IMAX, the influencing circuit 83 generates an influencing signal which decreases the error signal ER, or which is subtracted from the error signal ER such that the control signal ICO does not further increase. Effectively, when limiting, due to the closed loop formed by the copy circuit 81, the determination circuit 85, and the influencing circuit 83, the integrating action will be influenced by the influencing signal IA such that the copy control signal ICOC is limited to the maximum level IMAX. A similar reasoning holds for limiting the copy control signal ICOC to a minimum level.

Because the limiting action is applied on the copy control signal ICOC and not on the control signal ICO, the loop from the input voltage Vo to the control signal ICO is not opened. Consequently, the control signal ICO and the state of the integrator 11 are still in conformance with each other. Thus, when the limiting action is no longer required, the state of the integrator 11 has not drifted away, and the time required for the integrator 11 to retrieve its nominal state is not excessively long.

It has to be noted that by limiting the copy control signal ICOC, also the control signal ICO is limited. In regulation loops in which the controller 1 is used, often there is a need to limit the control signal ICO, for example to prevent an overload in the circuit to be controlled. Especially when the circuit to be controlled is a power converter, the currents through or the voltages over components of the power converter should be limited. In other applications, the speed with which the circuit is controlled may have to be limited.

It has to be noted that the main loop, which comprises the subtractor 10 and the integrator 11, is a known I-controller. The copy circuit 81, the determination circuit 85, and the influencing circuit 83, which are collectively also referred to as the limiting circuit 8, define an embodiment of the present invention.

Figure 3:
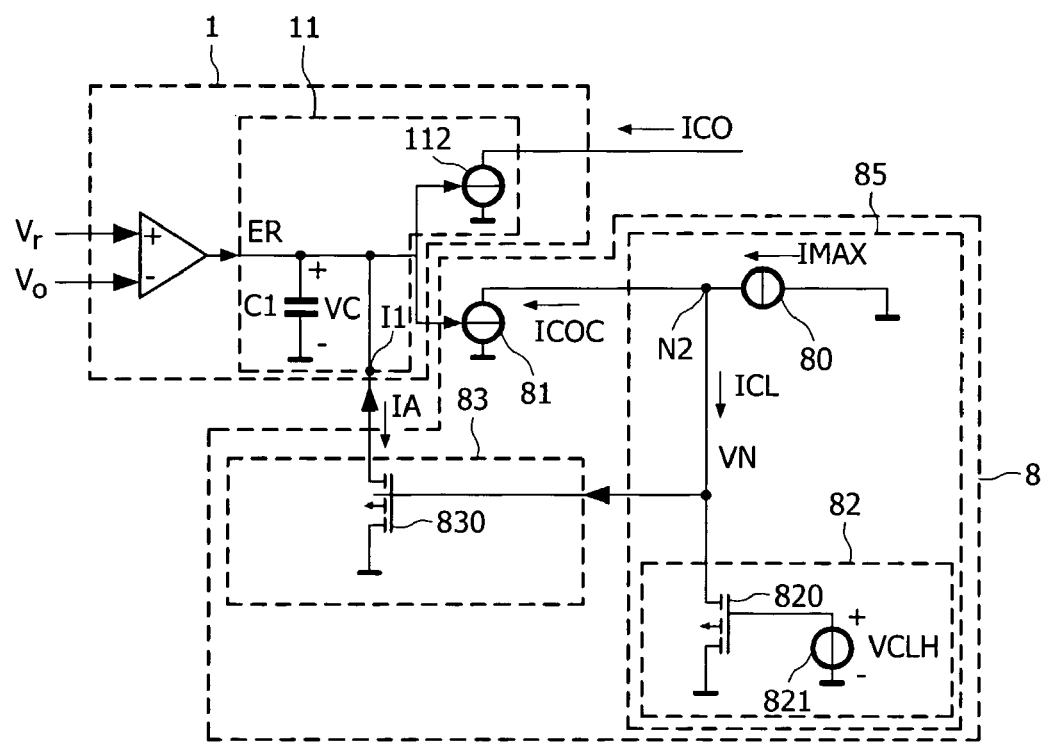
FIG. 3 shows a circuit diagram of an embodiment of the controller in which the control signal is limited to a maximum value.
Figure 4A:
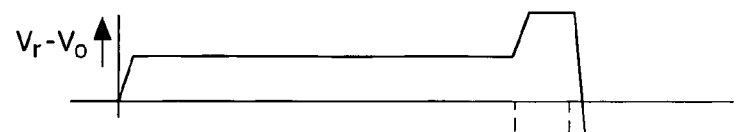
FIGS. 4 show signals elucidating the limitation of the control signal to a maximum value.
Figure 4B:
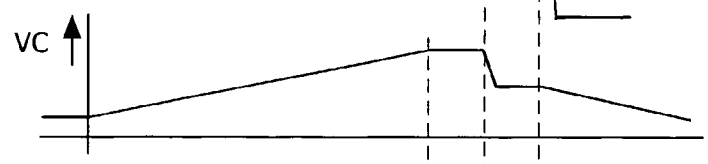
Figure 4C:
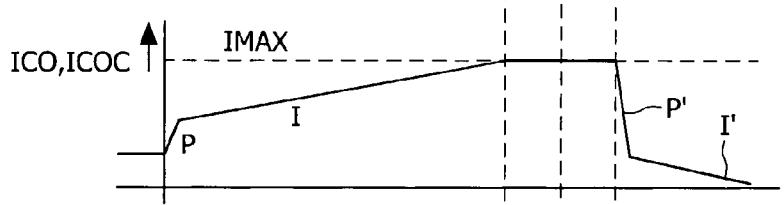
Figure 4D:
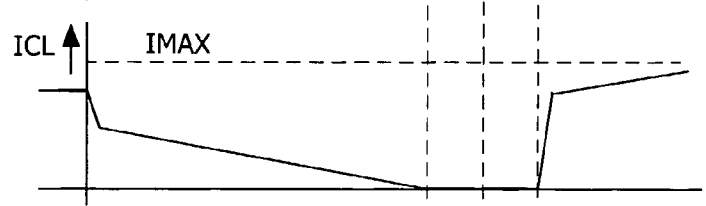
Figure 4E:
Figure 4F:
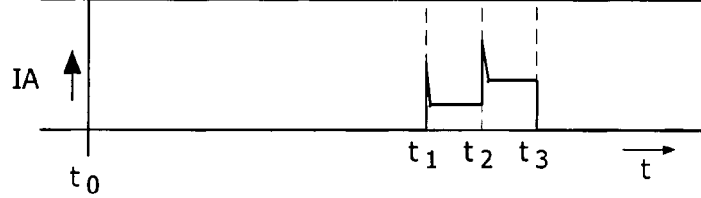

FIG. 3 shows a circuit diagram of an embodiment of the controller in which the control signal is limited to a maximum value. The controller 1 comprises the integrator 11 which comprises an integrating capacitor C1 and the current source 112. In FIG. 3 the controller 1 only comprises the integrator 11 and thus is an I-controller. The voltage VC across the capacitor C1 controls the current source 112 to supply the control signal ICO which is a current. However, the controller 1 may also comprise a P-action and/or a D-action (both not shown), which also influence the current source 112, and thus the control signal ICO. The integrating action of the integrator 11 may also by obtained with a digital solution.

The voltage VC across the capacitor C1 is supplied both to the current source 112 to obtain the control current ICO and to the current source 81 of the limiting circuit 8 to obtain a copy control current ICOC of the control current ICO. Alternatively, the voltage VC may only be supplied to the current source 112, and the copy control current ICOC may be a mirrored and/or scaled version of the control current ICO. The copy current ICOC is drawn out of a node N2. The limiting circuit 8 further comprises a current source 80, a clamping circuit 82 and an amplifier 83. The current source 80 supplies the current IMAX to the node N2. The current IMAX represents the maximum value to which the copy current ICOC should be limited. The clamping circuit 82 is coupled to the node N2 to limit the voltage VN at the node N2 to a maximum value. The difference current ICL is equal to the current IMAX minus the copy control current ICOC. The input of the amplifier 83 receives the voltage VN and its output is connected to the input of the integrator 11 to decrease the integrating action of the integrator 11 if the copy current ICOC reaches or surpasses the current IMAX. In the embodiment shown, wherein the integrator 11 comprises an integrating capacitor C1, the amplifier 83 draws a current IA out of this capacitor C1 when the limiting is active.

FIG. 3, as an example only, shows a particular embodiment of the clamping circuit 82 and the amplifier 83. The clamping circuit 82 and the amplifier 83 are designed such that always only one of them conducts current. The clamping circuit 82 comprises a FET 820 that has a main current path arranged between the node N2 and a reference potential, which in FIG. 3 is ground. A voltage source 821 that supplies a voltage level VCLH is connected between the control electrode of the FET 820 and the reference potential. The amplifier 83 comprises a FET 830 that has a control electrode connected to the node N2, and a main current path connected between the input I1 of the integrator 11 and the reference potential. As long as the copy current ICOC is smaller than the maximum current IMAX, the clamping circuit 82 sinks the difference current ICL and limits the voltage VN to a maximum value and the amplifier 83 current IA is zero. As soon as the copy current ICOC becomes larger than the maximum current IMAX, the difference current TCL changes polarity and the voltage VN drops. Due to the decreased level of the voltage VN, the clamping circuit 82 stops sinking current, and the amplifier 83 starts to draw current from the capacitor C1 to decrease the integrating action. The control loop, created by the limiting circuit 8 when the amplifier 83 is active, is designed to have a large open loop amplification factor such that the integrating action is influenced to obtain a copy current ICOC which is limited to the maximum current IMAX. Consequently, also the control current ICO is limited to a maximum value. The operation of the limiting circuit 8 of FIG. 3 is elucidated in more detail with respect to FIGS. 4.

FIGS. 4 show signals elucidating the limitation of the control signal to a maximum value. FIG. 4A shows the differential input voltage Vr–Vo, or the error signal ER which is the input signal of the integrator 11. FIG. 4B shows the voltage VC on the capacitor C1 of the integrator 11. FIG. 4C shows the copy control current ICOC and the control current ICO. It is assumed that the copy current ICOC is equal to the control current ICO. However, in a practical implementation, the copy control current ICOC may be a scaled version of the control current ICO. FIG. 4D shows the difference current ICL, FIG. 4E shows the voltage VN at the node N2, and FIG. 4F shows the current IA drawn out of the integrating capacitor C1.

It is assumed that the controller is operating in an open-loop mode and that at the instant t0 the level of the differential input signal Vr–Vo is increased. The integrator 11 starts charging the capacitor C1 and the voltage VC starts increasing. Although in FIG. 3 the integrator 11 only comprises an integrating action, it is in the now following assumed that the integrator 11 is a PI-controller. The control current ICO and its copy ICOC show a proportional increment (indicated by P in FIG. 4C), and an integrating increment (indicated by I in FIG. 4C). The difference current ICL is flowing towards the clamping circuit 82, the voltage VN is high and thus the clamping circuit 82 is able to sink the decreasing difference current ICL. The difference current ICL decreases because the increasing copy control current ICOC comes nearer to the maximum current IMAX supplied to the node N2 by the current source 80. The current IA conducted by the amplifier is zero due to the high level of. the voltage VN.

At the instant t1, the copy control current ICOC becomes equal to the maximum current IMAX. Now, the difference current ICL becomes zero or slightly negative and the voltage VN drops to a low level. Consequently, the clamping circuit 82 stops conducting and the amplifier 83 starts conducting the current IA. Now a feedback loop is obtained. The amplifier 83 has a large current gain, and the input current of the amplifier 83' is negligible, thus equilibrium in the feedback loop is restored when the copy control current ICOC becomes equal to the maximum current IMAX. Thus, the copy control current ICOC is limited to the maximum value IMAX.

At the instant t2, the differential input voltage Vr–Vo is further increased. The proportional part of the controller 11 outputs a higher proportional current in the control current ICO and its copy ICOC. This additional current is not shown in FIG. 4C because it will be immediately compensated by the compensating action of the amplifier 83 which increases the current IA to compensate for the extra proportional current. This extra current IA is obtained by a further decrease of the voltage VN at the node N2.

At the instant t3, the reference voltage is decreased such that the input difference voltage Vr–Vo becomes negative. The proportional part of the integrator 11 outputs a negative proportional contribution P' in the control current ICO and its copy ICOC which values now immediately drop below the maximum value IMAX. The voltage VN quickly rises, the amplifier current IA stops flowing, and the clamping circuit 82 starts conducting the increasing difference current ICL. The current limiting loop is now opened and the voltage VC on the capacitor C1 is not anymore influenced by the limiting circuit 8. Due to the negative input difference voltage Vr–Vo, the voltage VC on the capacitor C1 starts decreasing. The integrating part of the integrator 11 is indicated by I'.

It has to be noted that, although the limiting circuit 8 is elucidated with respect to an analog integrator 11 with the capacitor C1, the integrator 11 may also be implemented with digital circuits such as a counter. The amplifier 83 now has to act on the up-down counting mechanism of the counter. The integrator 11 may also lack the P-action and/or may include a D-action.

If the controller 1 is implemented in a power converter, it is important to select the value of the maximum current IMAX such that the limiting circuit 8 limits the control current ICO before the protection of the maximum current through the transistor switch S1 is activated, and before the inductor L is saturated.

It has further to be noted that existing protection circuits which have to protect the switches S1 and S2 of the power converter against too large currents, are unable to limit the average output current IOA of the converter. Instead, they limit the maximum current through the switches because of the presence of the ripple current. However, the ripple current varies with the output voltage. The ripple current amplitude is maximal when the output voltage is approximately half the battery voltage Vb, and the ripple current amplitude is approaching zero for output voltages near zero volt or near the battery voltage Vb.

A first known protection circuit, senses the current through the control switch S1 and compares it which a maximum value. The control switch S1 is immediately reset when is detected that the current through the control switch S1 becomes larger than the maximum value. The controller will respond with increasing the control current, and the next switching cycle, again the control switch S1 will be immediately reset when is detected that the current through the control switch S1 becomes larger than the maximum value. This will last until the cause of the too large current is taken away. In fact, the limiting loop opens the main loop, and thus it will take a considerable amount of time to recover from an overcurrent state.

As discussed earlier, U.S. Pat. No. 6,611,131 discloses two other prior art protection circuits which have the associated problems mentioned hereinbefore.

Figure 5:
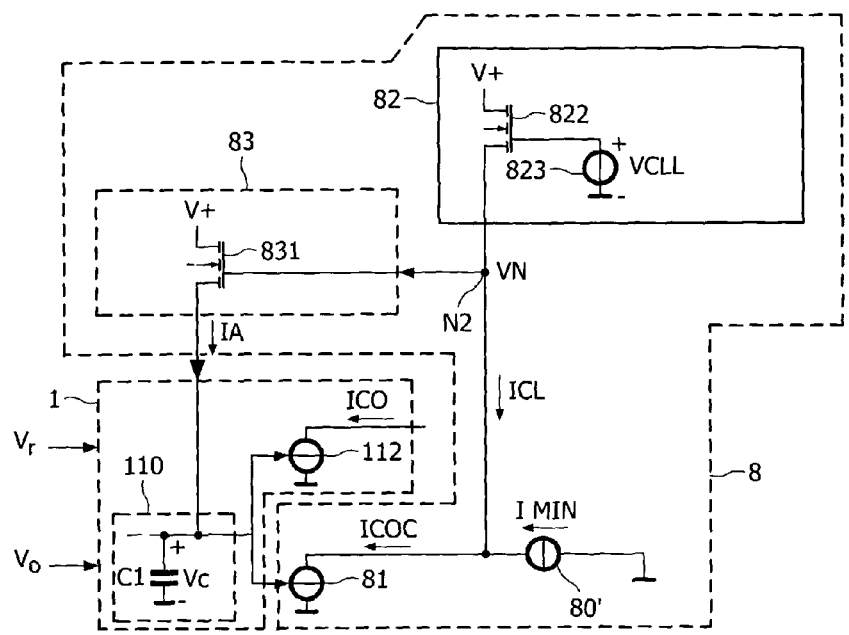
FIG. 5 shows a circuit diagram of an embodiment of the controller in which the control signal is limited to a minimum value.

FIG. 5 shows a circuit diagram of an embodiment of the controller in which the control signal is limited to a minimum value. The controller 1 is identical to that shown in FIG. 3. Thus, as in FIG. 3, the voltage VC across the capacitor C1 is supplied to the current source 112 to obtain the control current ICO, and to the control source 81 of the limiting circuit 8 to obtain a copy control current ICOC of the control current ICO. Again, the copy control current ICOC is drawn out of the node N2.

The limiting circuit 8 further comprises a current source 80', a clamping circuit 82 and an amplifier 83. The current source 80' supplies the current IMIN to the node N2. The current IMIN represents the minimum value to which the copy current ICOC should be limited. The clamping circuit 82 is coupled to the node N2 to limit the voltage VN at this node to a minimum value. The input of the amplifier 83 receives the voltage VN and its output is connected to the input of the integrator 11 to supply a current IA to the capacitor C1 to increase the integrating action if the copy current ICOC reaches or drops below the current IMIN.

The operation of the limiting circuit 8 shown in FIG. 5 is comparable to that of the limiting circuit 8 shown in FIG. 3. Briefly, as long as the copy control current ICOC is larger that the minimum current IMIN, the voltage VN at the node N2 is low and the difference current ICL is conducted by clamping circuit 82. The amplifier 83 is inactive and -the current IA is zero. When the copy current ICOC becomes equal to the minimum current IMIN, the voltage VN increases and causes the clamping circuit 82 to stop conducting current. The amplifier 83 starts supplying the current IA into the capacitor C1 to prevent the copy current ICOC to further decrease.

FIG. 5, as an example only, shows a particular embodiment of the clamping circuit 82 and the amplifier 83. The clamping circuit 82 and the amplifier 83 are designed such that always only one of them conducts current. The clamping circuit 82 comprises a FET 822 which has a main current path arranged between the node N2 and a reference potential, which in FIG. 3 is a positive potential V+. A voltage source 823, which supplies a voltage level VCLL, is connected between the control electrode of the FET 822 and another reference potential (ground). The amplifier 83 comprises a FET 831 which has a control electrode connected to the node N2, and a main current path connected between the input II of the integrator 11 and the reference potential V+. As long as the copy current ICOC is larger than the minimum current IMIN, the clamping circuit 82 sources the difference current ICL and limits the voltage VN to a minimum value. As soon as the copy current ICOC becomes equal to the minimum current IMIN, the difference current ICL changes polarity and the voltage VN rises. Due to the increased level of the voltage VN, the clamping circuit 82 stops sourcing current, and the amplifier 83 starts to supply current to the capacitor C1 to increase the integrating action. The control loop, created by the limiting circuit 8 when the amplifier 83 is active, is designed to have a large open loop amplification factor such that the integrating action is influenced to obtain a copy current ICOC which is limited to the minimum current IMIN. Consequently, also the control current ICO is limited to a minimum value.

Figure 6:
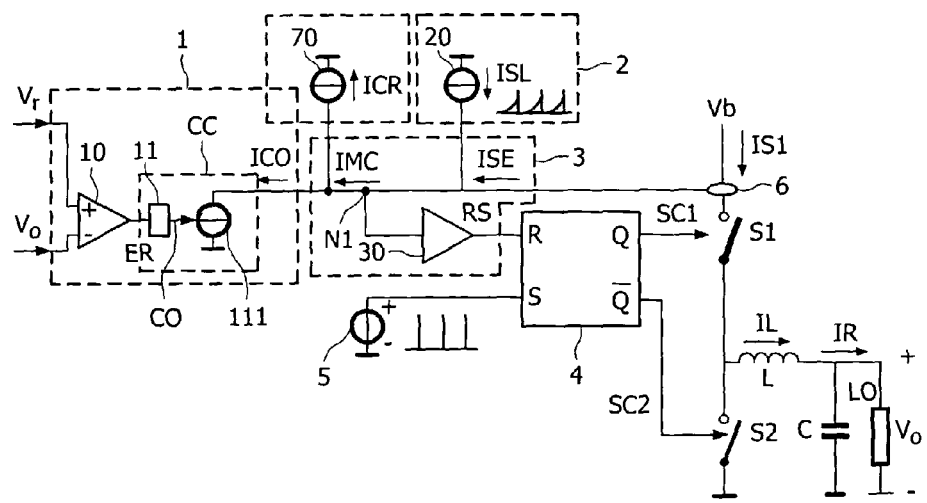
FIG. 6 shows a circuit diagram of an embodiment of the current-mode controlled DC/DC converter in accordance with an aspect of the invention.

FIG. 6 shows a circuit diagram of an embodiment of the current-mode controlled DC/DC converter in accordance with the invention. This embodiment is based on the block diagram of the prior art converter shown in FIG. 1. FIG. 6 shows a possible implementation in an integrated circuit that uses current sources.

First, the circuit equivalent with the converter shown in FIG. 1 is discussed, the current source 70 which supplies the correction current ICR is assumed to be not yet present. The controller 1 comprises the same subtractor 10, which receives the reference voltage Vr, and the input voltage Vo (which is the output voltage of the power converter) to supply the same error signal ER. The integrator 11 integrates the error signal ER to obtain a control signal CO which controls the current source 111 to draw the control current ICO from the node N1. The current-mode controller CC may, besides the integrator 11 also comprise a P and/or D action to obtain a PI, or PID controller to generate the control signal CO from the error signal ER.

The slope compensation circuit 2 comprises a current source 20 which supplies a slope compensation current IS1 to the node N1. The sense circuit 6 now supplies a sensed current ISE, which is representative for the inductor current IL, to the node N1. A voltage at the node N1 is determined by the sum of the currents ICO, ISE and ISL. The comparator 3 now comprises the amplifier 30 which supplies the reset signal RS which indicates when the level of the sensed current ISE becomes equal to the difference of the control current ICO and the slope compensation current ISL. Both the oscillator 5 and the Set-Reset Flip-Flop 4 are identical to the same items shown in FIG. 1. Also the topology formed by the switch S1, S2, the inductor L, the capacitor C and the load LO is identical to that shown in FIG. 1. The operation of this implementation in an integrated circuit of the known converter, and the drawbacks thereof are elucidated in detail with respect to the signals shown in FIG. 7.

In an embodiment of the converter in accordance with the present invention, a correction circuit 7 is added. In the embodiment shown in FIG. 6, the correction circuit 7 comprises a current source 70 which draws a correction current ICR out of the node N1. The operation of this embodiment is elucidated in detail with respect to the signals shown in FIG. 8. Alternative embodiments of the correction circuit 7 are discussed with respect to FIGS. 11 and 12.

Figure 7:
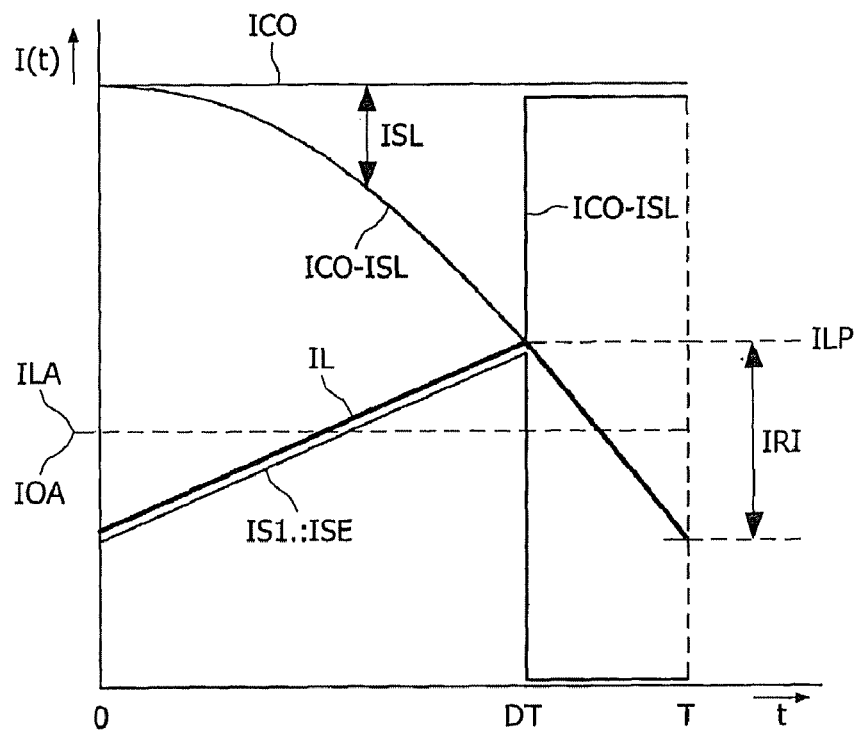
FIG. 7 shows signals elucidating the operation of the prior art current-mode controlled DC/DC converter.

FIG. 7 shows signals elucidating the operation of the prior art current-mode controlled DC/DC converter. FIG. 7 shows a steady state situation wherein the level of the inductor current IL at the end t=T of a switching period T is identical to the level of the inductor current IL at a start t=0 of a switching period T. The current IS1 through the switch S1 is identical to the inductor current IL during the on-period lasting from the instant 0 to the instant DT during which the switch S1 is closed. The sensed current ISE is proportional to the current IS1 through the switch S1. The control current ICO has a predetermined constant level in the steady state. The difference current of the control current ICO and the slope compensation current ISL is shown as the curve indicated by ICO-ISL. At the instant DT, the sensed current ISE becomes equal to the difference current ICO-ISL and the Set-Reset Flip-Flop 4 is reset. The switch S1 is opened and the switch S2 is closed. Now, during the off-period which lasts from the instant DT to the instant T, the inductor current IL decreases. The current IS1 through the switch S1 and thus the sensed current ISE drop to zero, the slope compensation current ISL is switched off (ISL=0) and the difference current ICO-ISL becomes equal to the control current ICO. It has to be noted that in a practical embodiment the currents may be scaled versions of the real currents. The average inductor current ILA is indicated by the dashed line. In a buck converter, the average output current IOA is the current supplied to the parallel arrangement of the smoothing capacitor C and the load LO and thus is equal to the average inductor current ILA. This average output current IOA is averaged over the switching period T. For a boost converter, which has a switch S2 at its output, the current supplied to this parallel arrangement differs from the average current ILA through the inductor L.

From FIG. 7 it becomes clear that the gain from the control current ICO to the average output current IOA is not 1. This is caused by the slope compensation current ISL and the ripple IRI on the inductor current IL. The slope compensation current ISL causes the control current ICO to be larger than the peak inductor current ILP. The ripple current IRI causes the average inductor current ILA to be lower than the peak inductor current ILP. The gain Ai from the control current ICO to the average output current IOA is $Ai=IOA/ICO$ To elucidate the effect on the small-signal bandwidth of the current-mode controlled DC-DC buck converter, it is assumed that the controller 11 is a PI-controller, such that the transfer from the inputs (Vr and Vo) to the output (ICO) of the current-mode controller 1 is $ICO/(Vr-Vo)=gHF*(1+j\omega\tau)/j\omega\tau$ wherein gHF is the value of the high-frequency transfer (the proportional part), and τ is the time constant of the integrating part.

The output voltage Vo is filtered by the capacitor C, and the load LO is considered to be a resistor. Therefore, the transfer from the average output current IOA to the output voltage Vo is $Vo/IOA=R/(1+j\omega RC)$ The open loop gain from the differential input voltage Vr–Vo to the output voltage Vo is thus $Vo/(Vr-Vo)=Ai*gHF*R*(1+j\omega\tau)/(j\omega\tau*(1+j\omega RC))$ The open loop gain has a low-frequency pole at fp=1/(2jπRC) and a high-frequency zero at fz=1/(2πτ).

The unity-gain frequency of the open-loop gain is $f1=(Ai*gHF)/(2\pi C)$

The closed-loop gain has a −3dB bandwidth f3 that can be approximated by the unity-gain frequency f1 of the open-loop. Thus, the closed-loop −3 dB bandwidth f3 depends on the value of the output capacitor C, the high-frequency transfer gHF, and the gain Ai of the transfer from control current ICO to average output current IOA. The values of the capacitor C and the transfer gHF are well known, however, the value of the gain Ai is smaller than 1, and is not fixed. Due to the fact that Ai is smaller than 1, the closed-loop bandwidth of the transfer from reference voltage Vr to output voltage Vo is smaller than maximal possible. This is a disadvantage because it limits the possibilities of the converter to accurately follow fast variations of the reference voltage Vr at the output.

Figure 8:
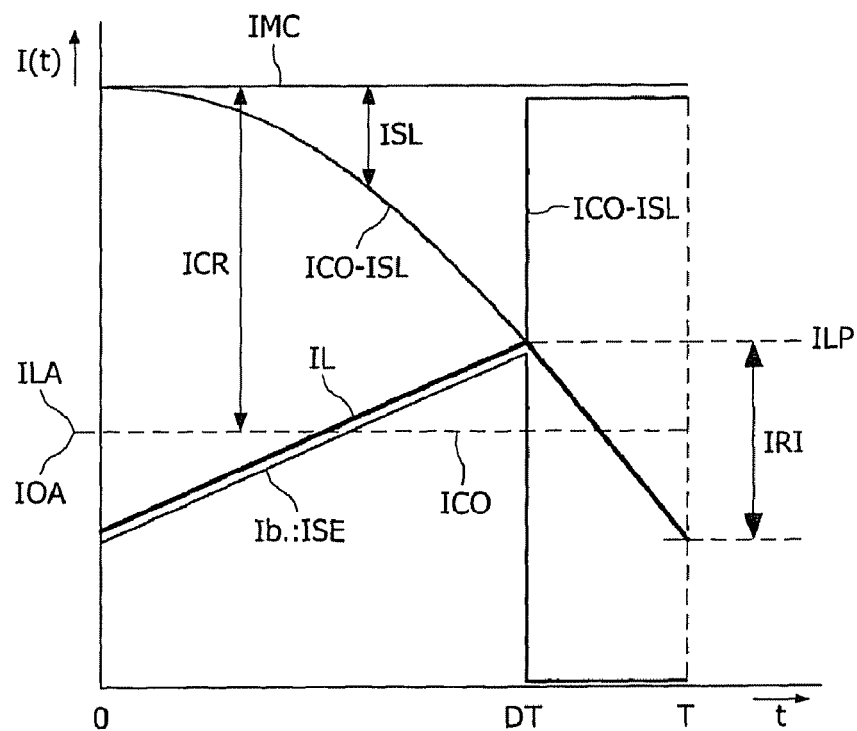
FIG. 8 shows signals elucidating the operation of the current-mode controlled DC/DC converter shown in FIG. 6.

FIG. 8 shows signals elucidating the operation of the current-mode controlled DC/DC converter shown in FIG. 6. Now, the correction circuit 7 has been added which comprises a current source 70 which draws a correction current ICR out of the node N1. Because, in the same steady state, the same current IS1 flows through the switch S1, the sensed current ISE is identical to that of the prior art converter. Also, the slope compensation current ISL is considered to be identical to that of the prior art converter. Again, in the same steady state, the total current at the node N1 should cause a reset of the Set-Reset Flip-Flop 4 at the same instant DT. Consequently, the effect of adding the correction circuit 7 is that the control current ICO must decrease exactly with the value of the correction current ICR.

Thus, if the correction current ICR is selected to be equal to the sum of the level of the slope compensation current ISL at the switch off instant DT and half the ripple current IRI, the control current ICO becomes equal to the average inductor current ILA. Consequently, the gain Ai of the transfer from control current ICO to average output current IOA becomes equal to 1 and the closed-loop bandwidth of the transfer from reference voltage Vr to output voltage Vo has its maximum value.

In the now following, the operation of the converter, which has such a correction circuit 7, is elucidated. Again, by way of example only, the converter is a buck converter, and the controller CC is a PI controller which comprises the integrator 11. Further, the current source 70 draws the correction current ICR from the node N1, by way of example, near to the current source 111 which draws the control current ICO from the node N1, as shown in the Figure. The sum of the correction current ICR and the control current ICO is denoted by the sum-current IMC which is drawn out of the node N1. The sum of the slope compensation current ISL and the sensed current ISE is flowing towards the node N1. Thus the Set-Reset Flip-Flop 4 will be reset at the instant DT that the sensed current ISE reaches the level of sum-current IMC from which the slope compensation current ISL is subtracted. The sum-current IMC is also referred to as the modified control signal MCO in FIGS. 11 and 12.

In FIG. 8, it is assumed that the correction current ICR has a value such that the modified control signal IMC has the same level as the control signal ICO in FIG. 7. Consequently, the control signal ICO in FIG. 8 corresponds directly with the average inductor current ILA and the average output current IOA. The word "corresponds" is used to indicate that scaled versions of the actual currents may be used. In all other aspects, FIG. 8 is identical to FIG. 7.

In the now following calculation, the value of the correction current ICR is determined for a buck-converter wherein the slope compensation is parabola shaped. From FIG. 7 it follows that the difference between the control current ICO and the average output current IOA is $ICO-IOA=ISL(DT)+IRI/2$ wherein ISL(DT) is the slope compensation current at the instant DT at which the switch S1 is switched off, and IRI is the peak to peak ripple current through the inductor current IL. The optimal slope compensation current ISL for a buck-converter is $$ISL(t)=\frac{1}{2}*(t/T)^2*(T/L)*Vb=(t^2 Vb)/2TL$$

wherein t/T is the relative position in a clock cycle with duration T, L is the inductor value of the inductor L, and Vb is the DC input voltage of the converter. This input voltage may be supplied by a battery.

At the instant of switching off the switch S1 (which is also referred to as the control switch), the slope compensation current ISL has the value $$ISL(DT)=\frac{1}{2}*D^2*(T/L)*Vb$$

wherein D is the steady state value of the duty cycle, which, if neglecting losses, is Vo/Vb. The peak to peak ripple current on the coil current ILA or the output current IOA is for a buck-converter $$IRI=DT*(Vb-Vo)/L$$

With the above equations, the difference between the control current ICO and the average output current IOA is $$ICO-IOA=ISL(DT)+IRI/2=(T*Vo)/(2L)$$

Consequently, if the correction current ICR has this value (T*Vo)/(2L), the control current ICO becomes equal to the average inductor current ILA and thus also to the average output current IOA. It has to be noted that the correction current ICR is a positive feedback current.

The current gain Ai which describes the transfer from the control current ICO to the average output current IOA, now has a unity magnitude. Consequently, the –3 dB bandwidth f3 of the loop has increased to $$f3 \approx gHF/(2\pi C).$$

A further advantage is that the 31 3 dB bandwidth depends on two well-known quantities only.

A similar improvement of the reaction speed is obtained if other converter topologies than a buck-converter are used, or when the PI controller CC has another behavior, or when the slope compensation has a different shape or is not present at all.

Figure 9:
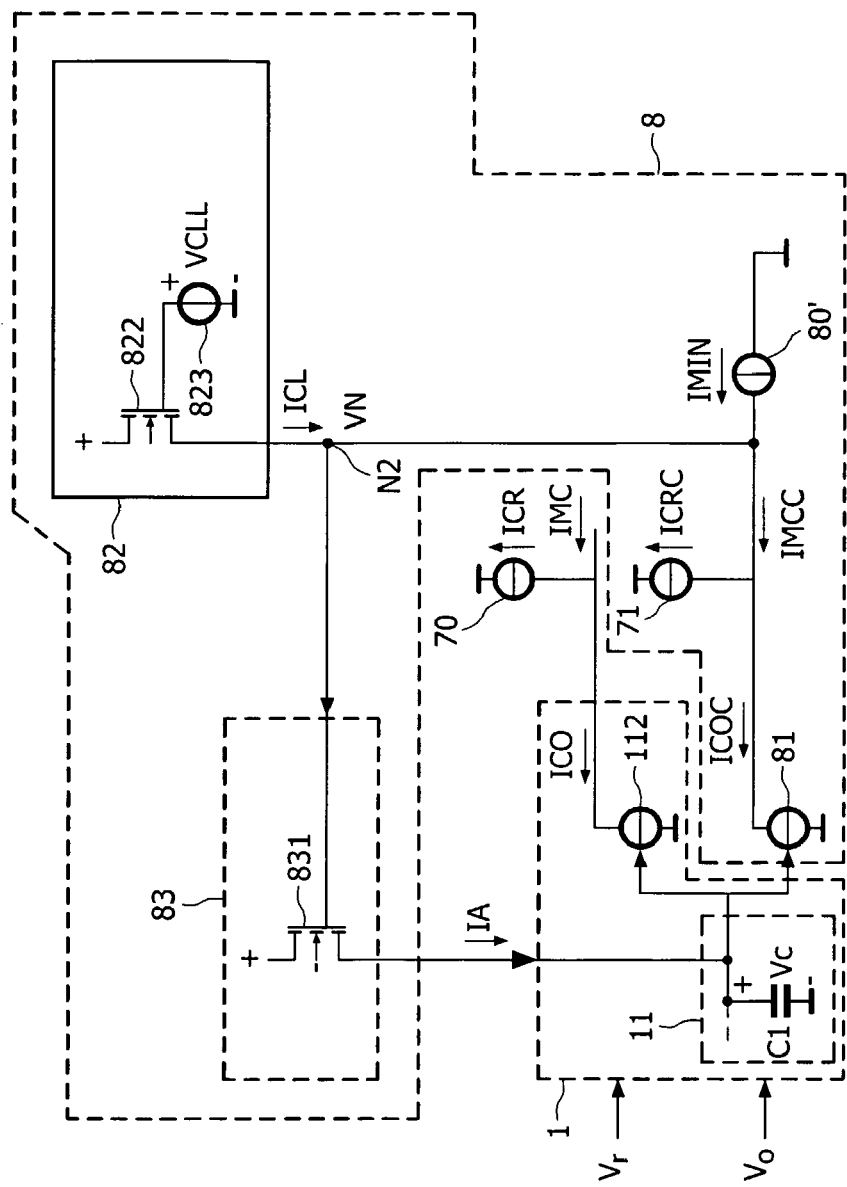
FIG. 9 shows a circuit diagram of an embodiment of the controller of the current-mode controlled DC/DC converter in which the modified control signal is limited to a minimum value.

FIG. 9 shows a circuit diagram of an embodiment of the current-mode controlled DC/DC converter in which the modified control signal is limited to a minimum value larger than zero. FIG. 9 is based on FIG. 5, the first difference is that a current source 70 which conducts the correction current ICR has been added at the output of the current source 112, as also is shown in FIG. 6. The sum of the correction current ICR and the control current ICO is the modified control current IMC. The second difference is that a current source 71 has been added at the node N2 to conduct a copy current ICRC of the correction current ICR. The sum of the copy correction current ICRC and the copy control current ICOC is the modified copy current IMCC.

The clamping circuit 82 conducts current as long as the modified copy current IMCC as larger than the minimum current IMIN which is larger than zero. The amplifying circuit 83 is inactive and thus does not influence the integration node in the integrator 11. When the modified copy current IMCC becomes smaller than the minimum current IMIN supplied by the current source 80', the clamping circuit 82 ceases conduction and the amplifier 83 starts supplying current IA to the capacitor C1 of the integrator 11. Consequently, the copy control current ICOC is controlled such that the modified copy current IMCC is limited to the level of the minimum current IMIN.

To determine the proper value of the minimum current IMIN, first the operation is considered of the circuit of FIG. 6, but without the correction circuit 7, as is elucidated with respect to FIG. 7. In this prior art circuit, the reset input R of the Set-Reset Flip-Flop 4 becomes active (high) at the instant DT at which the current through the control switch S1 becomes equal to or larger than a difference control current ICO-ISL which is equal to the control current ICO minus the slope compensation current ISL, see FIG. 7. As a result, the control switch S1 becomes non-conductive and the slope compensation current source 20 is switched off. In order to be sure that the reset input R is made inactive (low), it is required that the difference control current ICO-ISL is at least larger than the sensed current ISE which is positive.

Now, it is assumed that further the correction current source 70, which supplies the correction, current ICR is present in the FIG. 6 topology. The difference between the control current ICO and the modified control current IMC is equal to the correction current ICR. Again, to be sure that the reset input R is made inactive the modified control current IMC should be positive. Consequently, the minimum current IMIN should be selected larger than zero.

A consequence of meeting the requirement that the modified copy current IMCC cannot become smaller that the minimum current IMIN is that the average inductor current ILA may become negative. The converter is able to convert the energy stored in the smoothing capacitor C back to the power supply voltage Vb. The converter now more or less operates as a boost converter from the output capacitor C to the battery which supplies the supply voltage Vb. It has to be noted that the current in the switch S1 now may become negative, thus this switch S1 should have bi-directional current capability. Also the switch S2 should have bi-directional current capability and thus should be a synchronous switch and not a diode.

Figure 10:
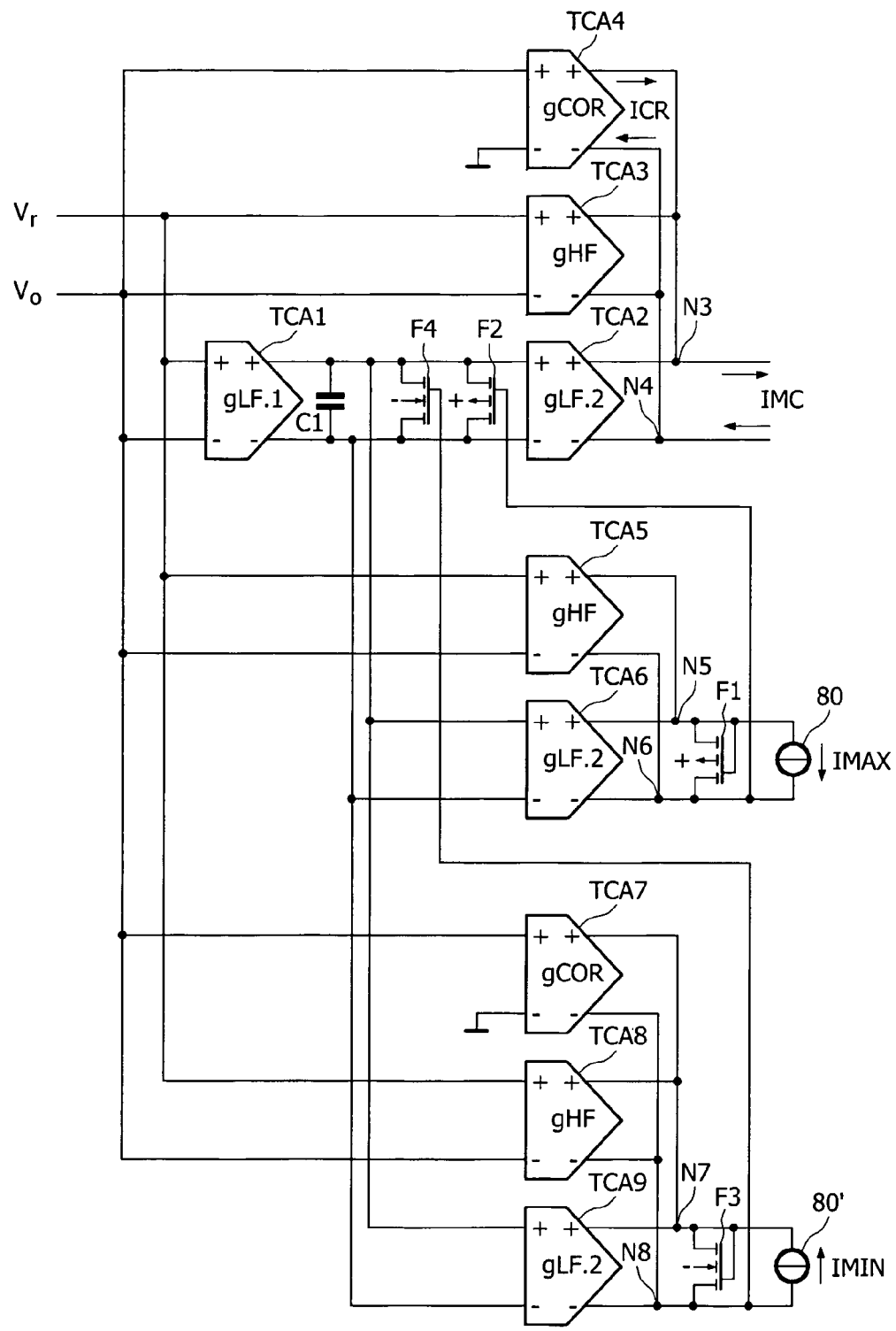
FIG. 10 shows a circuit diagram of an embodiment of the controller and the correction circuit for implementation in an integrated circuit.

FIG. 10 shows a circuit diagram of an embodiment of the controller and the correction circuit implemented in an integrated circuit. An attractive manner to realize a PI-controller in an integrated circuit is to use fully differential circuitry to profit maximally from common-mode rejection to suppress spurious signals, which are often present, especially in switched-mode power supplies. The required common-mode control loops, which set the common mode voltages of the nodes to appropriate values, are not shown.

The transconductance amplifier TCA3 receives the reference voltage Vr at the non-inverting input and the output voltage Vo at the inverting input, and supplies output currents to nodes N3 and N4. The transconductance amplifier TCA3 has a transfer determined by the transconductance gHF which represents the high-frequency proportional part of the PI-controller 1 or CC. The low-frequency integrating part of the PI-controller is generated by the transconductance amplifiers TCA1 and TCA2 and the capacitor C1. These amplifiers TCA1, TCA2, and the capacitor C1 thus form the integrator 11. The transconductance amplifier TCA1 with transconductance gLF1 receives the reference voltage Vr at the non-inverting input and the output voltage Vo at the inverting input, and supplies output currents to the capacitor C1. The transconductance amplifier TCA2 with transconductance gLF2 receives the voltage across the capacitor C1 between the non-inverting input and the inverting input, and supplies its output currents to the nodes N3 and N4. As far as the components discussed so far are considered, an attractive ICimplementation of the prior art PI-controller is obtained. The sum of the currents at the nodes N3 and N4 form the output currents indicated by IMC. These currents IMC form the control signal ICO of FIG. 1.

The control signal ICO may be changed into the modified control current IMC which corresponds to the modified control current IMC shown in FIG. 6 by adding the transconductance amplifier TCA4 with transconductance gCOR. The transconductance amplifier TCA4 has a non-inverting input which receives the output voltage Vo and an inverting input which is connected to a reference voltage which is ground. The transconductance amplifier TCA4 supplies the correction currents ICR to the nodes N3 and N4.

The limiting circuit 8 which limits the maximum value of the control signal ICO comprises: the current source 80 which supplies the maximum current IMAX from the node N5 to the node N6, the transconductance amplifier TCA5 with transconductance gHF, the transconductance amplifier TCA6 with transconductance gLF2, and the FET's F1 and F2. In fact, F2 is part of the amplifier 83. The transconductance amplifier TCA5 receives the reference voltage Vr at the non-inverting input and the output voltage Vo at the inverting input, and supplies output currents to the nodes N5 and N6. The transconductance amplifier TCA6 receives the voltage across the capacitor C1 between the non-inverting input and the inverting input, and supplies its output currents to the nodes N5 and N6 also. Thus, the transconductance amplifier TCA5 supplies the proportional part of the copy control current ICOC of FIG. 3, and the transconductance amplifier TCA6 supplies the integrating part of the copy control current ICOC. The FET F1, which has a main current path, arranged between the nodes N5 and N6 and a control electrode connected to the node N5 forms the clamping circuit 82 of FIG. 3. The FET F2, which has a main current path, arranged in parallel with the capacitor C1 and a control electrode connected to the node N6 forms the amplifier 83 of FIG. 3.

The limiting circuit which limits the minimum value of the modified currents IMC of FIG. 6 and FIG. 9 comprises: the current source 80' which supplies the minimum current IMIN from the node N8 to the node N7, the transconductance amplifier TCA7 with transconductance gCOR, the transconductance amplifier TCA8 with transconductance gHF, the transconductance amplifier TCA9 with transconductance gLF2, and the FET's F3 and F4. The transconductance amplifier TCA9 receives the voltage across the capacitor C1 between the non-inverting input and the inverting input, and supplies its output currents to the nodes N7 and N8. Thus, the transconductance amplifier TCA8 supplies the proportional part of the copy control current ICOC of FIG. 9 to the nodes N7 and N8, and the transconductance amplifier TCA9 supplies the integrating part of the copy control current ICOC. The transconductance amplifier TCA7 has a non-inverting input which receives the output voltage Vo and an inverting input which is connected to a reference voltage which is ground, and supplies the correction currents ICRC to the nodes N7 and N8. The FET F3, which has a main current path, arranged between the nodes N7 and N8 and a control electrode connected to the node N7 forms the clamping circuit 82 of FIG. 9. The FET F4, which has a main current path, arranged in parallel with the capacitor C1 and a control electrode connected to the node N8 forms the amplifier 83 of FIG. 9.

Figure 11:
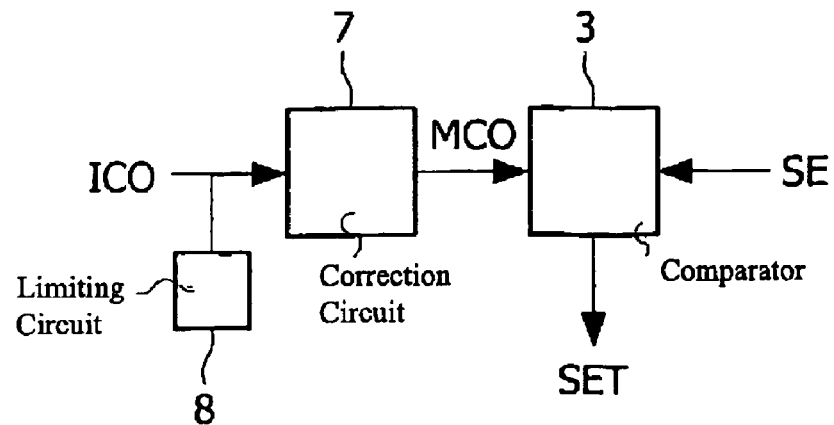
FIG. 11 shows a block diagram of embodiment of the current-mode controlled DC/DC converter in accordance with the invention.

FIG. 11 shows a block diagram of another embodiment of the current-mode controlled DC/DC converter in accordance with the invention. FIG. 11 shows an adaptation of the prior art converter shown in FIG. 1. Now the correction circuit 7 is inserted between the controller 11 and the comparator 3, while the slope compensation circuit 2 has been left out. The correction circuit 7 receives the control signal ICO and supplies a modified control signal MCO to the comparator 3.

The limiting circuit 8 is added to limit the maximum or minimum value of the control signal ICO. Because the control signal ICO is now representative for the average output current IOA, the limiting circuit 8 limits the average output current IOA of the converter.

Figure 12:
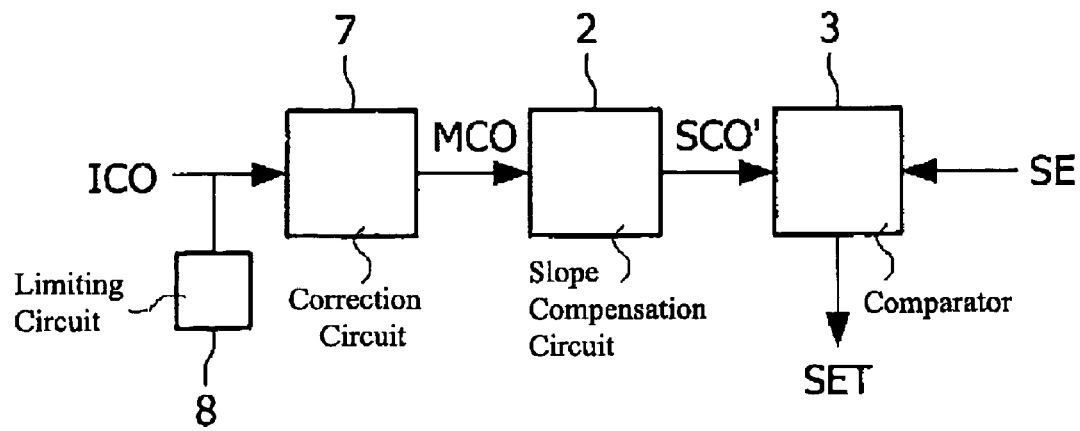
FIG. 12 shows a block diagram of another embodiment of the current-mode controlled DC/DC converter in accordance with the invention.

FIG. 12 shows a block diagram of yet another embodiment of the current-mode controlled DC/DC converter in accordance with the invention. FIG. 12 shows an adaptation of the prior art converter shown in FIG. 1. Now the correction circuit 7 is inserted between the . current-mode controller 11 and the slope compensation circuit 2. Again, the limiting circuit 8 is added to limit the maximum or minimum value of the control signal ICO. The correction circuit 7 receives the control signal ICO and supplies a modified control signal MCO to the slope compensation circuit 2. The slope compensation circuit 2 supplies the modified control signal SCO' to the comparator 3.

The limiting circuit 8 is added to limit the maximum or minimum value of the control signal ICO. Because the control signal ICO is now representative for the average output current IOA, the limiting circuit 8 limits the average output current IOA of the converter.

It should be noted that the above-mentioned embodiments illustrate rather than limit the invention, and that those skilled in the art will be able to design many alternative embodiments without departing from the scope of the appended claims.

For example, the current directions all may be inversed. The skilled person easily understands how to adapt the embodiments shown if PMOST FET's are replaced by NMOST FET's and the other way around.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A controller comprising:
   a comparator for comparing an input signal with a reference signal to obtain an error signal;
   an integrator for applying an integrating action on the error signal to obtain a control signal, the integrator allowing influencing of the integrating action;
   copy means for supplying a copy control signal being proportional to the control signal
   determination means for determining whether the copy control signal reaches a limit value; and
   influencing means for influencing the integrating action to limit the control signal when the copy control signal reaches the limit value,
   wherein the limit value indicates a maximum level, and wherein the influencing means is arranged for decreasing the integrating action when the copy control signal reaches the maximum level.

2. A controller as claimed in claim 1, wherein:
the copy means comprises a first current source for supplying the copy control signal as a first current to a node,
the determination means comprises (i) a second current source for supplying a predetermined fixed second current to the node, and (ii) a clamping circuit for limiting a voltage at the node, wherein the first current and the second current have an opposite polarity, and
the influencing means comprises an amplifier having an input connected to the node and an output connected to an input of the integrator for influencing the integrating action of the -integrator.

3. A controller as claimed in claim 2, wherein
the integrator comprises an integrating capacitor, and
the output of the amplifier is coupled to the integrating capacitor.

4. A controller as claimed in claim 2, wherein the integrator comprises a third current source for supplying the control signal as a third current being determined by a voltage across the integrating capacitor.

5. A controller as claimed in claim 4, wherein the amplifier comprises a transistor having a control input coupled to the node and a main current path being coupled to the integrating capacitor.

6. A controller as claimed in claim 2, wherein the clamping circuit comprises
a transistor having a control input and a main current path coupled to the node, and
a voltage source coupled to the control input.

7. A controller as claimed in claim 1, wherein
the comparator comprises a first transconductance amplifier having inputs for receiving the input signal and the reference signal and first outputs to supply the error signal,
the integrator comprises a capacitor arranged between the first outputs, and a second transconductance amplifier having inputs coupled across the capacitor, and second outputs for supplying the control signal as an output current
the copy means comprises a third transconductance amplifier having inputs coupled across the capacitor, and third outputs for supplying the copy control signal as a copy control current,
the determination means comprises a current source arranged between the third outputs, and a first transistor arranged between the third outputs to act as a clamp, the current source being arranged for supplying the limit value as a limit current, and
the influencing means comprises a transistor having a main current path arranged between the first outputs, and a control input coupled to one of the third outputs for influencing a voltage across the capacitor if the copy control current reaches the limit current.

8. A current-mode controlled DC/DC converter for receiving a power supply input voltage to supply a power supply output voltage to a load, the current-mode controlled DC/DC converter comprises:
the controller as claimed in claim 1 wherein the input signal is the power supply output voltage;
an inductor and a controllable switch being coupled to the inductor for obtaining a periodically varying inductor current through the inductor; and
a drive circuit for comparing a sensed signal being representative for the inductor current with the control signal to switch off the controllable switch when a level of the sensed signal reaches a level of the control signal.

9. A current-mode controlled DC/DC converter as claimed in claim 8, further comprising a correction circuit for adding to the control signal a correction signal being representative for a difference between an original level of the control signal and an average value of the inductor current to obtain a modified control signal, and wherein the drive circuit is arranged for comparing the sensed signal with the modified control signal to switch off the controllable switch when a level of the sensed signal reaches a level of the modified control signal.

10. A current-mode controlled DC/DC converter as claimed in claim 9, further comprising means for supplying a copy correction signal being proportional to the correction signal, and wherein:
the determination means are arranged for determining whether a sum of the copy control signal and the copy correction signal reaches the limit value, and
the influencing means are arranged for limiting the control signal when the sum of the copy control signal and the copy correction signal reaches the limit value.

11. A current-mode controlled DC/DC converter as claimed in claim 8, wherein:
the means for supplying the copy control signal comprises a first current source for supplying the copy control signal as a first current to a first node,
the determination means comprises a second current source for supplying a predetermined fixed second current to the first node, and a clamping circuit for limiting the voltage at the first node, and
the influencing means comprises an amplifier having an input connected to the first node and an output connected to an input of the integrator for influencing the integrating action of the integrator.

12. A current-mode controlled DC/DC converter as claimed in claim 11, further comprising a second current source for supplying a second current proportional to a correction current to the first node, and wherein the amplifier increases the integrating action when the first current drops below the sum of the minimum current level and a third current.

13. A current-mode controlled DC/DC converter as claimed in claim 8, wherein:
the controlled comprises a first current source for supplying to a first node a control current being determined by the control signal,
wherein the current-mode controlled DC/DC converter further comprises a sense circuit for sending the inductor current to supply the sensed signal being a sensed current to the first node, a polarity of the control current being opposite to a polarity of the sensed current, and
wherein the drive circuit is coupled to the first node for determining when a level of the sensed current reaches a level of the sum of the control current and a correction current.

14. An apparatus comprising a current-mode controlled DC/DC converter as claimed in claim 8, and signal processing circuits for receiving the power supply output voltage generated by the current-mode controlled DC/DC converter.

15. An apparatus as claimed in claim 14 being a mobile apparatus comprising a battery for supplying a battery voltage being the power supply input voltage, the current-mode controlled DC/DC converter being arranged for converting the battery voltage into the power supply output voltage.

16. A method of controlling comprising:
comparing an input signal with a reference signal to obtain an error signal;

applying an integrating action on the error signal to obtain a control signal, the integrator allowing influencing the integrating action;

supplying a copy control signal being proportional to the control signal;

determining whether the copy control signal reaches a limit value; and influencing the integrating action to limit the control signal when the copy control signal reaches the limit value, wherein the limit value indicates a minimum level or a maximum level, and wherein the integration action is increased or decreased when the copy control signal reaches the minimum level or the maximum level, respectively.

17. A controller comprising:

a comparator for comparing an input signal with a reference signal to obtain an error-signal;

an integrator for applying an integrating action on the error signal to obtain a control signal, the integrator allowing influencing of the integrating, action;

copy means for supplying a copy control signal being proportional to the control signal;

determination means for determining whether the copy control signal reaches a limit value; and influencing means for influencing the integrating action to limit the control signal when the copy control signal reaches the limit value, wherein the limit value indicates a minimum level, and wherein the influencing means is arranged for increasing the integrating action when the copy control signal reaches the minimum level.

18. A controller as claimed in claim 17, wherein:

the copy means comprises a first current source for supplying the copy control signal as a first current to a node, the determination means comprises (i) a second current source for supplying a predetermined fixed second current to the node, and (ii) a clamping circuit for limiting a voltage at the node, wherein the first current and the second current have an opposite polarity, and the influencing means comprises an amplifier having an input connected to the node and an output connected to an input of the integrator for influencing the integrating action of the integrator.

19. A controller as claimed in claim 18, wherein the integrator comprises an integrating capacitor, and the output of the amplifier is coupled to the integrating capacitor.

20. A controller as claimed in claim 18, wherein the integrator comprises a third current source for supplying the control signal as a third current being determined by a voltage across the integrating capacitor.

* * * * *